United States Patent [19]
Hrebicek

[11] 3,789,948
[45] Feb. 5, 1974

[54] MOTOR SPEED ACTUATED VEHICLE BUMPER

[76] Inventor: James Hrebicek, 2327 S. 61st Ave., Cicero, Ill. 60650

[22] Filed: Jan. 6, 1971

[21] Appl. No.: 104,441

[52] U.S. Cl. ................ 180/91, 180/108, 267/116, 267/139, 267/172, 293/2, 293/9, 293/84, 293/87
[51] Int. Cl. ..... B60r 19/06, B61f 19/04, F16f 13/00
[58] Field of Search ....... 293/2, 4, 9, 10, 68, 70, 71, 293/86, 87, 84; 180/1 R, 1 AP, 82, 91, 103, 180/105, 108; 267/20 R, 172, 116, 139

[56] References Cited
UNITED STATES PATENTS

| | | | |
|---|---|---|---|
| 2,185,936 | 1/1940 | Yamada | 180/92 |
| 2,207,666 | 7/1940 | Hirabayashi | 180/92 |
| R25,697 | 12/1964 | Hrebicek | 267/20 R X |
| 2,877,011 | 3/1959 | Hrebicek | 267/20 R |
| 3,207,496 | 9/1965 | Hrebicek | 267/172 |
| 3,355,208 | 11/1967 | Brock | 293/9 |
| 3,008,703 | 11/1961 | Slemmons et al | 267/35 X |

*Primary Examiner*—Gerald M. Forlenza
*Assistant Examiner*—Howard Beltran

[57] ABSTRACT

A motor actuated shock absorbing bumper has an improvement upon a variable rate spring used to absorb the energy of a collision, the improvement comprising a rate control for the spring, and means operated as a function of the speed of the vehicle for controlling the setting of the rate control such that the higher the speed at which a collision occurs, the stiffer the spring becomes. In its preferred form, the rate control comprises a piston, and the speed control comprises a variable pressure pump driven from the vehicle transmission output shaft and supplying liquid to the piston at a pressure which increases with the speed of the output shaft.

1 Claim, 3 Drawing Figures

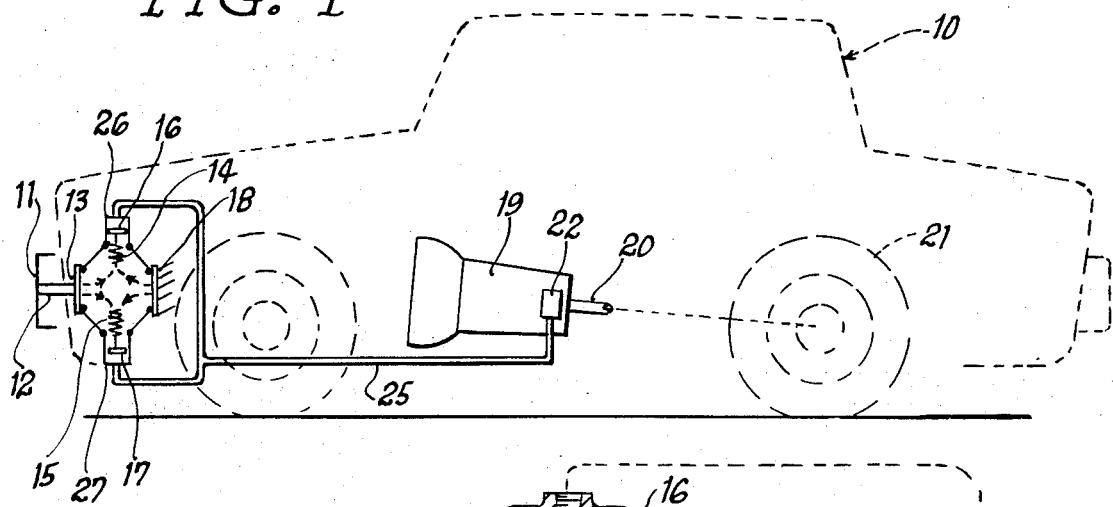
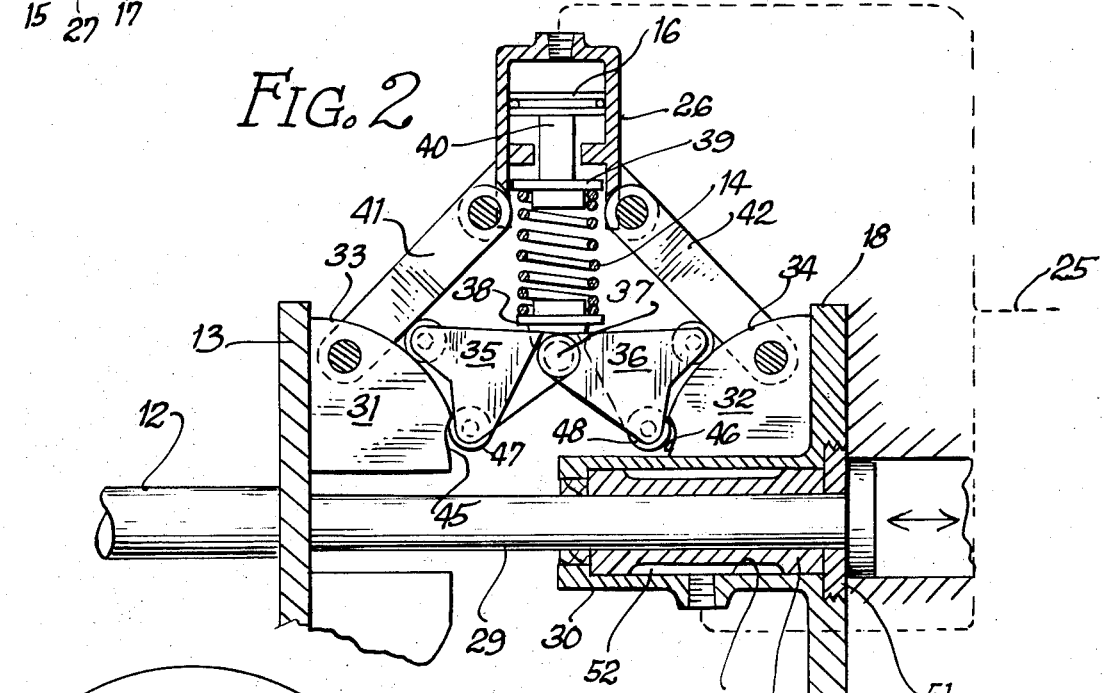
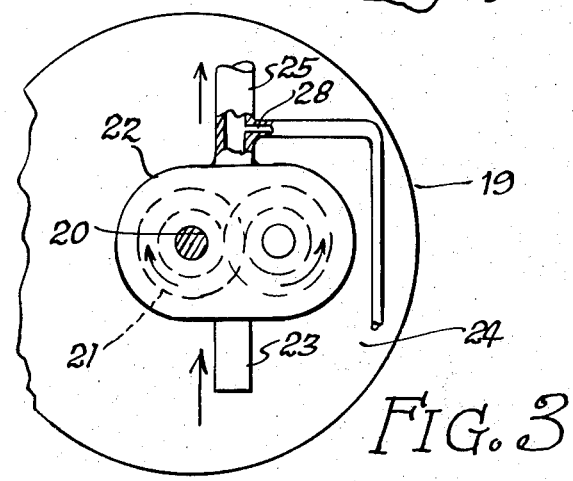
INVENTOR
James Hrebicek
by Charles F. Voytech
Atty

MOTOR SPEED ACTUATED VEHICLE BUMPER

This invention relates to variable rate springs and to a control therefor.

In my U.S. Pat. No. Re. 25,697 there is disclosed a variable rate spring used as a vehicle spring suspension. The rate of the spring is determined by the location of an abutment for the spring on the vehicle frame, the location of the abutment in turn being determined by a manually controlled fluid pressure system.

Recently, the high cost of collision damage sustained by automotive vehicles has made desirable the installation of energy absorbing devices on or in connection with the bumpers of such vehicles. Such devices, however, do not take into consideration the fact that for a collision at high speed the stiffness of the device should be greater than for one at low speed. The manually controlled variable rate spring of my aforesaid patent provides a device which is capable of adjustment by the operator to increase its resistance with speed. However, just prior to a collision, the operator is generally occupied with manipulating the steering wheel and may be holding the steering wheel with both hands to brace himself against the shock of an anticipated collision. He, thus, is not able to adjust the manually controlled fluid pressure system to attempt to match the stiffness of the spring with the speed of the impact.

The principal object of this invention is to provide a spring device for absorbing the shock of a vehicle collision or the like, wherein the initial resistance of the device is automatically adjusted in accordance with the speed with which the device is actuated, such that the said initial resistance will increase to produce a stiffer spring as the vehicle speed increases.

Another object of this invention is the provision of a spring device for use in the bumper system of a moving vehicle wherein the initial pressure of the spring is continuously varied in accordance with the speed of the vehicle.

Yet another object of this invention is to provide a control system for a spring comprising a variable pressure fluid pump driven by the output shaft of an automotive vehicle change speed transmission, the output of the pump being used to vary the initial compression of a spring forming part of a vehicle bumper system to increase the minimum force required to deflect the bumper system as the speed of the vehicle increases.

These and other objects of this invention will become apparent from the following detailed description thereof when taken together with the accompanying drawings in which:

FIG. 1 is a diagrammatic side elevational view of a vehicle in dotted outline in which the present invention is installed;

FIG. 2 is an enlarged fragmentary side elevational view of the variable rate spring of this invention; and FIG. 3 is an enlarged diagrammatic view of a variable pressure pump suitable for use in this invention.

Briefly described, this invention comprises a bumper operated spring, the initial compression of which is determined by the position of an abutment against which the spring bears. The abutment is connected to a piston which is subject to the output pressure of a variable pressure pump driven from the output shaft of the vehicle change speed transmission. Pump pressure is made to increase as the speed of the output shaft increases, i.e., as the vehicle speed increases.

Referring now to the drawings for a detailed description of the invention, there is shown in dotted outline, a vehicle 10, which for purposes of illustration may be taken to be a passenger automobile. It is understood, however, that this invention can be used with any vehicle which is or can be equipped with a bumper, including any of the highway and railroad vehicles as well as off-the-road vehicles such as farm equipment and earth moving equipment. Said vehicle 10 is provided with a front bumper 11 which extends across the front of the vehicle 10 and is connected by a thrust bar 12 to the active element 13 of a resilient shock-absorbing device which for purposes of illustration may be of the type disclosed in my U.S. Pat. Nos. 2,877,011; 3,207,496 or Re. 25,697. Such prior devices are designed to produce a compression in one or more springs 14, 15 by means hereinafter to be described, the initial compression of said springs being determined by the position of abutments controlled by hydraulic pistons 16, 17. The reaction of the thrust impressed upon the springs 14, 15 is taken by an abutment 18 fixed to the chassis of the vehicle.

It is understood that vehicle 10 is provided with an engine-driven change speed transmission 19 the output shaft 20 of which is connected to drive the rear wheels 21 of the vehicle and hence changes its speed as the vehicle speed changes. Said transmission output shaft 20 drives a pump 22 (FIG. 3), preferably of the positive displacement type such as a gear pump, the pump intake 23 being connected to the transmission oil reservoir 24 and the pump output 25 being connected to cylinders 26, 27 in which pistons 16 and 17 operate. An orifice 28 of predetermined size in the output 25 of pump 22 provides a means by which pressure of the oil in the output 25 increases with the speed of the output shaft 20. Other known means for producing an output pressure which varies with the speed at which pump 22 is driven may be used in place of orifice 28.

The spring selected to illustrate this invention is shown in greater detail in FIG. 2. Active member 13 is connected to abutment 18 by one or more telescoping guides 29, 30. Secured to active member 13 and abutment 18 are cams 31 and 32 which have substantially identical cam surfaces 33 and 34 on which ride triangular follower carriages 35 and 36 pivotally connected together at their apices 37. Said apices are also pivotally connected to a recessed spring holder 38 in which one end of spring 14 is retained. The other end of spring 14 is received in a spring holder 39 connected by a piston rod 40 to piston 16.

Cylinder 26 is connected by links 41 and 42 to cams 31 and 32 or to some part rigidly connected to active element 13 and abutment 18. Said levers 41 and 42 cause cylinder 26 to move in the same direction as the apices 37 of carriages 35, 36, but at a different rate, the rate being determined by the lengths of said levers and by the disposition of their connections to active element 13 and abutment 18. The shapes of the surfaces 33, 34 on cams 31, 32 determine the rate at which the apices 37 move. The difference in the rates of movement of cylinder 26 and apices 37 determines the rate at which spring 14 is compressed.

It is understood that spring 15 is operated by a system of cams, carriages and levers in the same manner as spring 14, the illustration and description thereof being omitted herein for brevity.

Cam surfaces 33 and 34 are each formed with a depression 45 and 46 into which one of the rollers 47 and 48 of each of the carriages fall when the spring is extended to its maximum length. Said depressions restrain the rollers and carriages from moving until a predetermined force is applied against active element 13, i.e., against bumper 11. This avoids deflections of spring 14 under minor, harmless impacts or collisions, and allows the metal of the bumper to take directly so much of the shock as the operator of the vehicle can safely stand before calling the spring into play.

In operation, the piston 16 will assume a position in its cylinder 26 dictated by the pressure of the fluid in said cylinder. This pressure will be proportioned to the speed of the vehicle so that at higher vehicle speeds the pressure will be higher, thus preloading spring 14 to cause it to require a greater force to compress it per unit of deflection. Since the force of a collision increases as a function of a vehicle speed, the increased spring pressure will prevent a premature collapse of the spring at higher vehicle speeds.

Telescoping guide part 30 may be made to retard the movement of part 29 thereinto in accordance with the speed of the vehicle. Thus part 30 may be formed with a recess 49 in which is disposed a spool-shaped bushing 50 made of Nylon or the like, said bushing being retained in recess 49 by a threaded cap 51. The space 52 around the spool is connected to pump output 25 so that it is subjected to the same pressure as piston 16. The construction of bushing 50 is such that the higher the pressure in space 52 the tighter will be the fit between bushing 50 and guide part 29 passing therethrough. This increased tightness increases the braking effect of bushing 50 upon part 29 and hence contributes to the increased stiffness of the shock absorbing device as a whole as the speed of the vehicle increases.

Although the device of FIG. 2 shows piston 16 connected directly to spring holder 39, said piston may take a form (not shown) in which it is connected to said spring holder by an intervening rack and pinion turning a nut which advances or retracts a screw connected to said holder 39.

The specific disposition of the shock absorbing device of this invention on a vehicle is a matter of design to be determined by the appearance of the vehicle and the location of its frame, spring, shock absorbing and steering members. Similar shock absorbing devices can be located between the rear bumper and vehicle frame, or at any point on a vehicle requiring protection against shock loads. Where the vehicle does not have a change speed transmission, such as a railroad car, the fluid pressure pump can be driven by some member rotating with the vehicle wheels.

I claim:

1. In combination a spring, an abutment for the spring, an active element adapted to engage the spring to expand or contract said spring against said abutment, a variable speed shaft, means intermediate the abutment and spring and movable as a function of the speed of said shaft for changing the position of said abutment relative to said spring, and telescoping guide means connecting the active element and the abutment, and means for retarding the movement of said telescoping guide means as a function of the speed of said shaft.

* * * * *